US005992292A

United States Patent [19]

Ennenga

[11] Patent Number: 5,992,292

[45] Date of Patent: Nov. 30, 1999

[54] FIRE CONTROL DEVICE FOR, IN PARTICULAR, TRANSPORTABLE AIR DEFENSE SYSTEMS

[75] Inventor: Luitjen Ennenga, Hude, Germany

[73] Assignee: STN Atlas Elektronic GmbH, Bremen, Germany

[21] Appl. No.: 08/348,560

[22] Filed: Mar. 3, 1994

[30] Foreign Application Priority Data

Mar. 5, 1993 [DE] Germany ............................ 43 06 913

[51] Int. Cl.[6] ................................ F41G 5/18; F41G 3/18; G06F 19/00

[52] U.S. Cl. ....................... 89/41.22; 89/41.06; 89/41.09; 244/3.11; 244/3.16; 235/412; 235/413; 235/416; 33/238; 33/239

[58] Field of Search ............................ 33/237, 238, 239; 89/1.8, 1.802, 1.815, 41.05, 41.06, 41.22; 235/407, 411, 412, 413, 414, 415, 416; 244/3.11, 3.16

[56] References Cited

U.S. PATENT DOCUMENTS

| | | | |
|---|---|---|---|
| 2,569,571 | 10/1951 | Newell et al. | 89/41.09 |
| 2,609,606 | 9/1952 | Draper et al. | 89/41.22 |
| 2,660,794 | 12/1953 | Goertz et al. | 33/239 |
| 3,575,085 | 4/1971 | McAdam | 89/41.06 |
| 5,123,327 | 6/1992 | Alston et al. | 89/41.06 |
| 5,180,881 | 1/1993 | Wootton et al. | 89/41.06 |
| 5,197,691 | 3/1993 | Amon et al. | 89/41.06 |

FOREIGN PATENT DOCUMENTS

| | | | |
|---|---|---|---|
| 665 493 A5 | 5/1988 | Switzerland . | |
| 1309230 | 3/1973 | United Kingdom . | |
| 1309793 | 3/1973 | United Kingdom . | |
| 1488828 | 10/1977 | United Kingdom . | |
| 1573628 | 8/1980 | United Kingdom . | |
| 2216995 | 10/1989 | United Kingdom | 89/1.8 |

*Primary Examiner*—Stephen M. Johnson
*Attorney, Agent, or Firm*—Venable; Norman N. Kunitz

[57] ABSTRACT

A fire-control system for anti-aircraft defense systems, particularly mobile ones, having at least one launch apparatus for guided missiles that is pivotable in elevation and disposed on a platform that is pivotable in azimuth, has an optical target-tracking sensor that is rigidly coupled with the launch apparatus, a follow-up computer for panning the target-tracking sensor after targets, a directional angle computer for calculating lead and elevation of the guided missile during launch, and a control unit that has adjustment drives for the platform and launch apparatus, which unit pivots the platform in azimuth and the launch apparatus in elevation, and, prior to launch, locks the lead on the platform and the elevation on the launch apparatus. For the purpose of a very rapid second attack, the line of sight of the target-tracking sensor rigidly coupled with the launch apparatus is guided via a vertically and horizontally pivotable pivoting mirror that is positioned during lock-on of lead and elevation by azimuth and elevation angles that correspond to those for the platform and launch apparatus, but in a direction counter to the direction of displacement of the platform and launch apparatus.

4 Claims, 3 Drawing Sheets

FIRE CONTROL DEVICE FOR, IN PARTICULAR, TRANSPORTABLE AIR DEFENSE SYSTEMS

BACKGROUND OF THE INVENTION

The invention relates to a fire-control apparatus for anti-aircraft defense systems, particularly mobile ones, of the generic type including: a platform that rotates around a vertical axis; at least one launch apparatus for guided missiles provided with homing heads, which apparatus is pivotable around a horizontal axis and is disposed on the platform; at least one optical target-tracking sensor, which continuously determines target data, such as position, velocity and range, rigidly coupled with the launch apparatuses; a directional angle computer that is connected to the target-tracking sensor and, from the target data, calculates the estimated point of impact of a guided missile and an airborne target and the directional angles "lead" and "elevation" necessary for the launch of the guided missile; a follow-up computer that is connected to the target-tracking sensor and generates follow-up signals in azimuth and elevation from the deviations of the target position from the line of sight of the target-tracking sensor; and a control unit, which is connected to the follow-up directional angle computers and has adjustment drives for the platform and the launch apparatus, which pivots the platform in azimuth and the launch apparatuses in elevation as a function of the follow-up signals and, prior to launch, locks the lead on the platform and the elevation on the launch apparatus.

In a known fire-control apparatus for an anti-aircraft tank with cannon (CH 665,493.A5), the target-tracking sensor includes a tracking radar, which automatically tracks the target, and supplies continuously measured data, such as target position, velocity and acceleration, as well as a laser range finder, which supplies a redundant, interference-immune measurement of target distance. The target data of the tracking radar and of the laser range finder are transmitted to the directional angle computer, which utilizes them to determine the directional angles for lead and elevation for the turret and weapon, taking into consideration everyday conditions such as initial projectile velocity, air pressure, temperature, wind intensity and wind direction.

The tracking radar, the laser range finder and the weapon are autonomous systems connected with one another by means of follow-up computers.

In a known fire-control apparatus of the above-mentioned type for anti-aircraft systems equipped with guided missiles, such as Stingers, Mistrals or the like, optical sensors such as a TV camera and/or an infrared camera connected to a laser range finder are used as target-tracking sensors. Because guided missiles have their own homing head, which typically operates on an infrared basis, for structural simplification the target-tracking sensor is rigidly coupled with the launch apparatus for the guided missiles, which is pivotable in elevation, and the two are disposed together on a platform that is rotatable in azimuth. In this way, the line of sight of the target-tracking sensor and the longitudinal axis of the launch apparatus for the guided missiles are always oriented nearly parallel to one another, so that the control unit need only adjust the platform in azimuth and the launch apparatus in elevation corresponding to the follow-up signals generated by the follow-up computer in order to pan the target-tracking sensor. During tracking the line of sight of the homing head of the guided missile is aligned with the axis of the launch apparatus and thus, like the line of sight of the target-tracking sensor, oriented toward the target. Before the missile is launched, target lock-on is effected by the stabilized homing head of the guided missile, following which the platform is pivoted by the lead in azimuth, and the launch apparatus is pivoted in elevation by the tangential sight. The consequence of this is that the homing head of the guided missile tracks the target, but the lines of sight of the target-tracking sensor and the guided missile themselves are pivoted by the directional angles and are oriented toward the calculated point of impact, the so-called "kill point," and therefore no longer toward the target. The resulting loss of target by the target-tracking sensor has the drawback that, to execute a second launch toward the same target with a second launch apparatus that is rigidly coupled with the first launch apparatus and always takes part in its adjustment motion, the target must be reacquired, then transmitted to the target-tracking sensor. In many cases, the required, not insignificant, time span until the second launch occurs reduces the fighting power of the anti-aircraft defense system. The same problem occurs when, after the first projectile has been launched, a second target is to be attacked that is flying close to the tracked target and is therefore in the visual field of the target-tracking sensor. The consequence of the loss of the target by the target-tracking sensor during launch of the guided missile is that the second target is also lost, and must be subsequently reacquired.

It is an object of the invention to improve a fire-control apparatus of the type described at the outset such that, during target lock-on prior to launch, and the associated adjustment of the launch apparatus by the required directional angle in azimuth and elevation, the target-tracking sensor remains in contact with the target.

SUMMARY OF THE INVENTION

The above object generally is achieved in accordance with the invention, by a fire-control apparatus for anti-aircraft defense systems, particularly mobile ones, which apparatus is of the type including: a platform that rotates around a vertical axis; at least one launch apparatus for guided missiles provided with homing heads, which apparatus is pivotable around a horizontal axis and is disposed on the platform; at least one optical target-tracking sensor, which continuously determines target data, such as position, velocity and range rigidly coupled with the launch apparatuses; a directional angle computer that is connected to the target-tracking sensor and, from the target data, calculates the estimated point of impact of a guided missile and an airborne target and the directional angles "lead" and "elevation" for the launch of the guided missile; a follow-up computer that is connected to the target-tracking sensor and generates follow-up signals in azimuth and elevation from the deviations of the target position from the line of sight of the target-tracking sensor; and a control unit, which is connected to the follow-up and directional angle computers and has adjustment drives for the platform and the launch apparatus, which pivots the platform in azimuth and the launch apparatuses in elevation as a function of the follow-up signals, and which, prior to launch, locks the lead on the platform and the elevation on the launch apparatus; and wherein the line of sight of the target-tracking sensor is guided via a vertically and horizontally pivotable pivoting mirror, and a mirror drive that drives the pivoting mirror is controlled by the control unit such that the pivoting mirror, prior to launch, is adjusted in lead and elevation ($\alpha$) by an azimuth angle and an elevation angle ($\epsilon$) corresponding to but counter to the direction of adjustment of the platform and launch apparatus.

In the fire-control apparatus of the invention, the adjustments or displacements of the target-tracking sensor associated with target lock-on by the lead and elevation that are to take place prior to launch of the guided missiles are compensated by a pivoting of the line of sight of the target-tracking sensor that is of equal magnitude, but oriented in the opposite direction. This is effected by a corresponding adjustment in the pivoting mirror, which is disposed to be pivoted biaxially in the line of sight. The target-tracking sensor always remains locked on the target, even after launch. A second launch toward the target, or a further launch toward a second target located within the visual field of the target-tracking sensor, is possible within a very short time following the formation of lead and elevation by the directional angle computer and re-adjustment of the launch apparatus. The time-consuming search and transmission of the target to the target sensor are completely eliminated, so the required time until the release of the second launch is reduced considerably. Hence, the fighting power of the fire-guiding system is significantly increased.

Advantageous embodiments of the fire-control apparatus of the invention are described in detail below by way of an embodiment illustrated in the drawings.

DETAILED DESCRIPTION OF THE PREFERRED EMBODIMENTS

Figure 1:
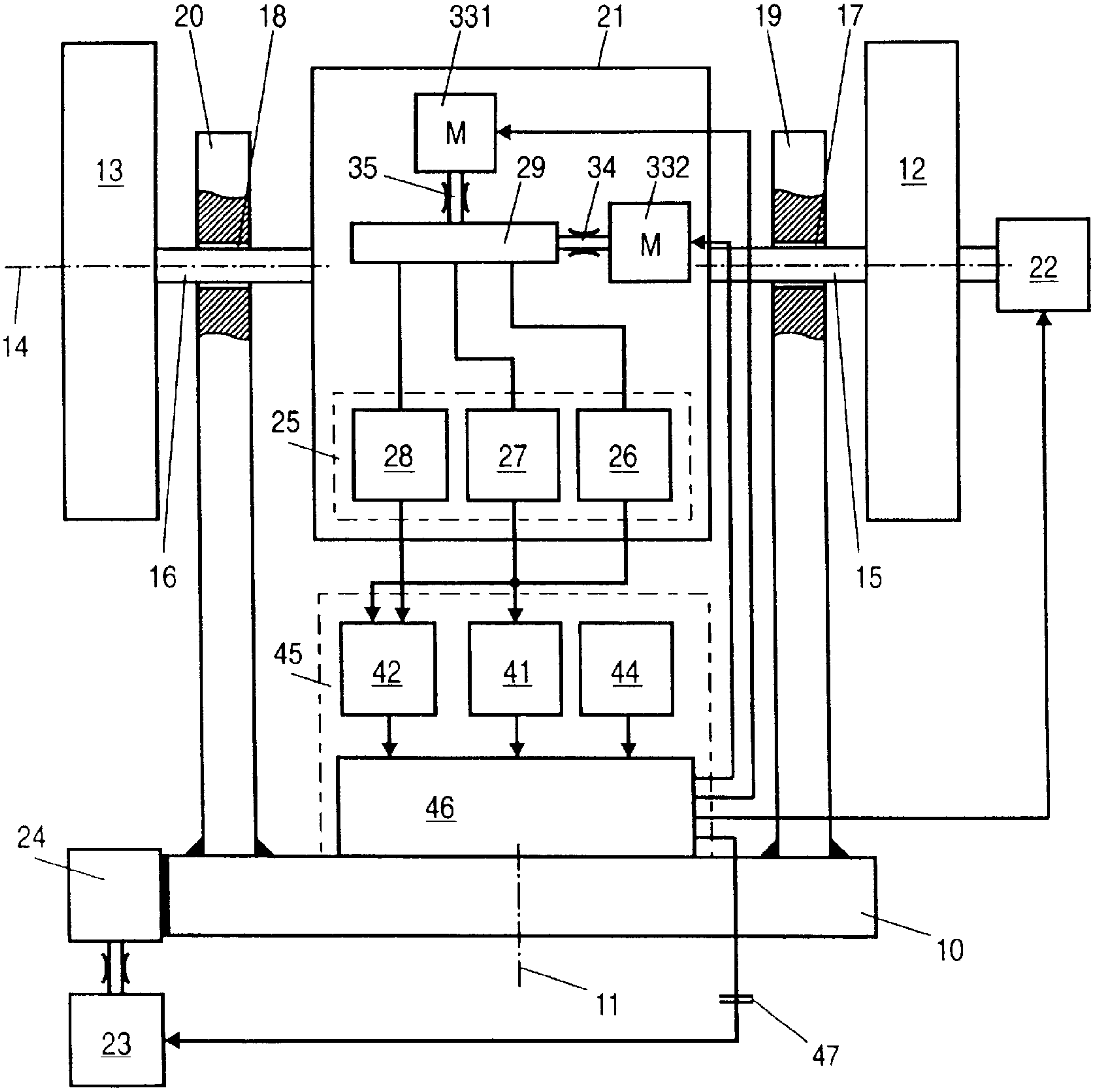
FIG. 1 is a block circuit diagram of a fire-control apparatus for a mobile aircraft defense system having guided missiles.

The fire-control apparatus for a mobile aircraft defense system, shown principally in a circuit diagram in FIG. 1, has a platform 10, which is seated to rotate around a vertical axis 11, and two launch apparatuses 12, 13, so-called launchers, which are disposed on the platform 10, and are designed to launch guided missiles, not shown here, that have infrared homing heads. The two launch apparatuses 12, 13 are rigidly coupled with one another and can be pivoted around a horizontal axis 14, for which purpose they are received with shaft ends 15, 16 into two pivot bearings 17, 18 secured to the platform. The pivot bearings 17, 18 are integrated into two bearing blocks 19, 20, which are spaced from one another and are at a distance from and a right angle to the platform 10 (see also FIGS. 2 and 3). A sensor housing 21 that is connected to the two shaft ends 15, 16 in a manner fixed against relative rotation, and thus rigidly connected to the two firing apparatuses 12, 13, is disposed between the bearing blocks 17, 18. The two firing apparatuses 12, 13 and sensor housing 21 are pivoted in azimuth around the horizontal axis 14 by an adjustment drive 22. An adjustment drive 23 which, for example, drives platform 10 via a drive gear 24 that meshes with outer gear teeth on platform 10 is provided for rotating platform 10 around its vertical axis 11.

Figure 4:
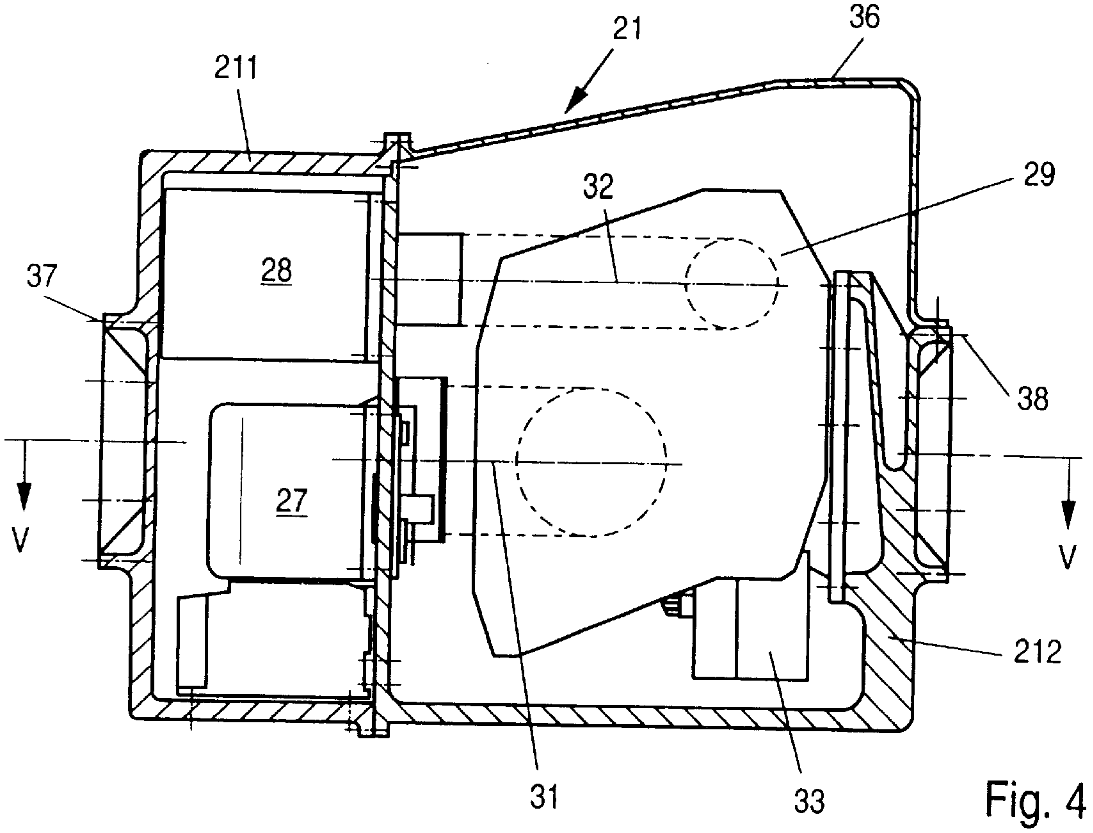
FIG. 4 is a longitudinal section of a sensor housing of the fire-control apparatus in FIGS. 2 and 3.
Figure 5:
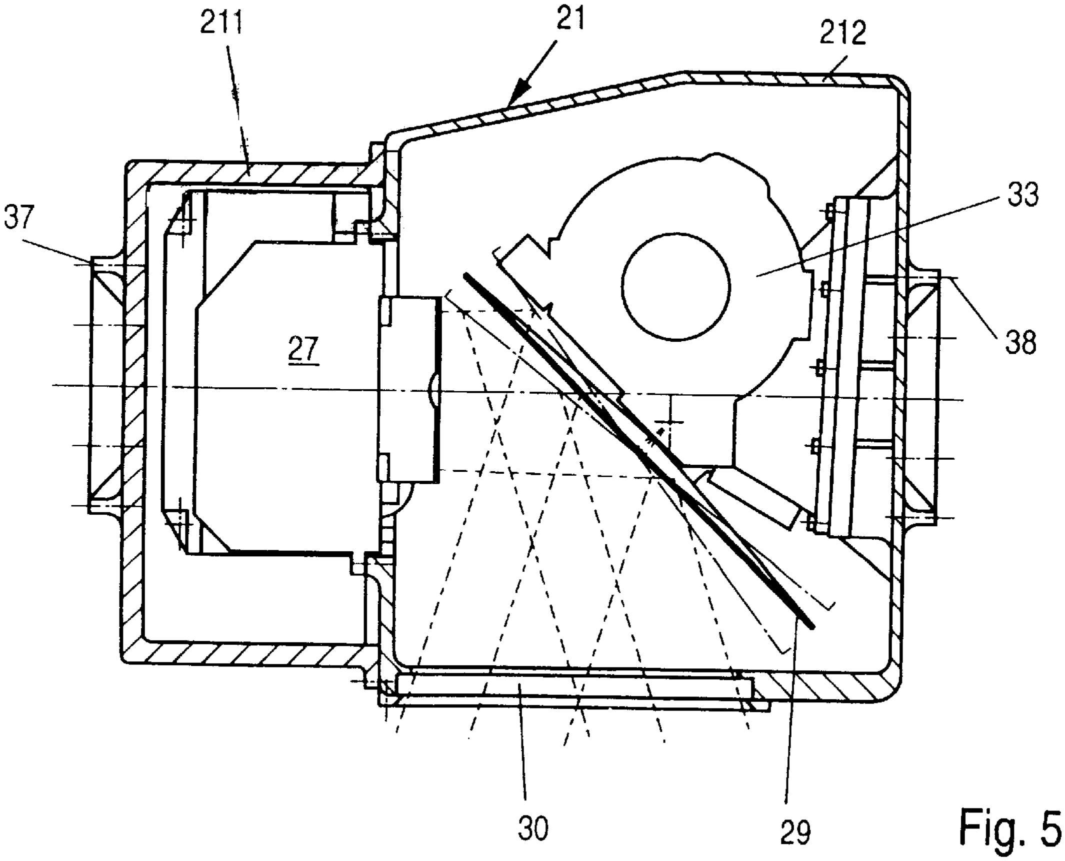
FIG. 5 is a section along line V—V in FIG. 4.

The fire-control apparatus has at least one target-tracking sensor 25, which in this instance includes a TV camera 26 for daytime viewing, an infrared camera 27 for night viewing and a laser range finder 28 for measuring the laser range. The line of sight of the target-tracking sensor 25 installed in sensor housing 21 is guided outwardly via a pivoting mirror 29 and a viewfinder window 30 in sensor housing 21 (FIG. 5). In FIGS. 4 and 5 the line of sight of IR camera 27 is marked with 31, and the line of sight of laser range finder 28 is marked with 32. The line of sight of TV camera 26 (shown only in block form in FIG. 1) is not shown, but can coincide with the line of sight 31 of IR camera 27 because infrared camera 27 and TV camera 26 are only operated alternatingly. Pivoting mirror 29 is biaxial, as shown symbolically in FIG. 1, and is seated to pivot vertically and horizontally. As shown schematically in FIG. 1, the pivoting of the mirror 29 around its two axes is effected by a mirror drive 33 realized by two servomotors 331 and 332, which rotate pivoting mirror 29 around its horizontal or vertical axis 34 or 35, respectively.

Sensor housing 21 is shown in longitudinal section in two different sectional planes in FIGS. 4 and 5. Sensor housing 21 is embodied in two parts, and receives target-tracking sensor 25 with TV camera 26, IR camera 27 and laser range finder 28 in the left, cap-shaped housing part 211, and pivoting mirror 29 with mirror drive 33 in the right, flanged-on housing part 212. As can be seen from FIG. 4, the right housing part 212 is covered with a cover 36, so that after cover 36 is removed, pivoting mirror 29 and mirror drive 33 are accessible. To the left and right on sensor housing 21, i.e. on one side on housing part 211 and on the other side on housing part 212, two central supports 37, 38 are integral with sensor housing 21; these supports project beyond shaft ends 15, 16 of launching apparatuses 12, 13, and are connected with them in a manner fixed against relative rotation. Sensor housing 21 is oriented toward launch apparatuses 12, 13 such that lines of sight 31, 32 of target-tracking sensor 25 are exactly parallel to the longitudinal axes 39, 40 of the two launch apparatuses 12, 13 when pivoting mirror 29 is in its base position; this is indicated schematically in FIG. 2.

Figure 3:
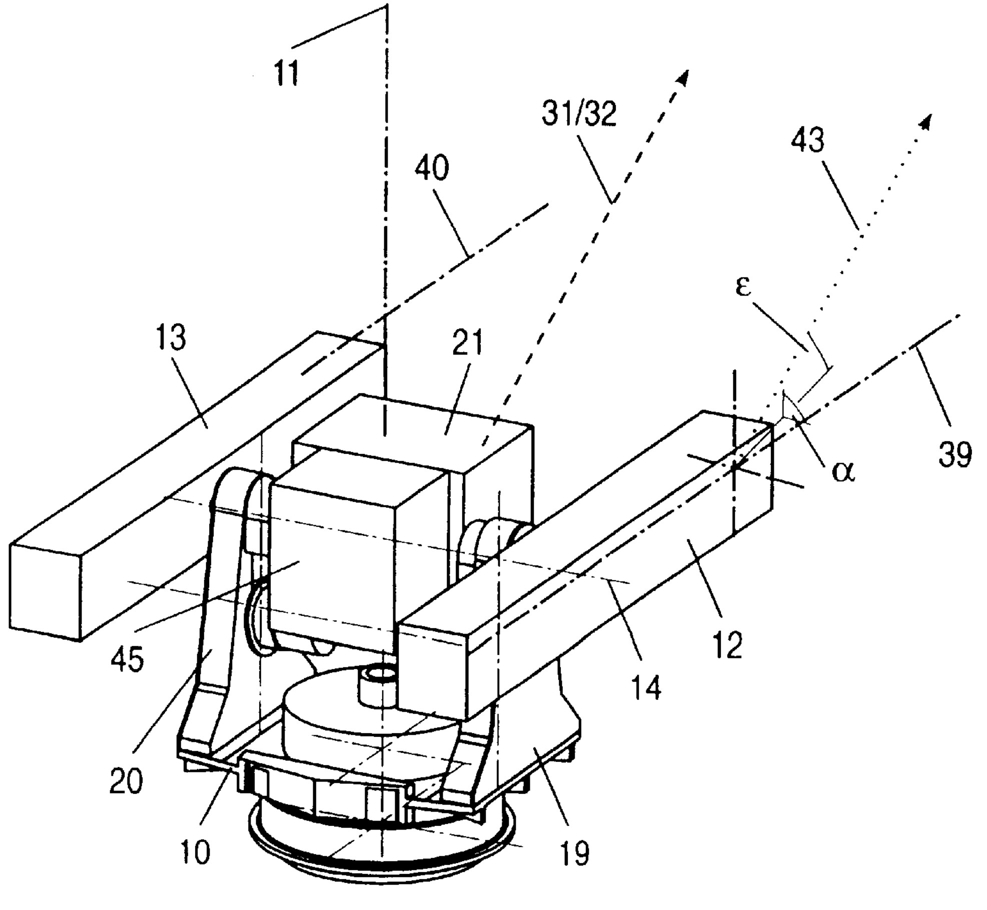

Once a target has been acquired, target-tracking sensor 25 continuously pans the airborne target, thereby continuously acquiring target data such as position, velocity and range. From the amount of deviation of the target position from the line of sight of target-tracking sensor 25 (line of sight 31 of TV camera 26 or IR camera 27), a follow-up computer 41 connected to TV camera 26 or IR camera 27 generates follow-up signals in azimuth and elevation that are supplied to a control unit 46. As a function of these follow-up signals, control unit 46 pivots launch apparatuses 12, 13 with sensor housing 21 and platform 10 via adjustment drives 22, 23. The target data outputted continuously from target-tracking sensor 25, and from TV camera 26 or IR camera 27 and laser range finder 28, are supplied to a directional angle computer 42. From these data, and using the launch data of the guided missiles as a basis, this computer calculates the estimated point of impact (kill point) of guided missile and target, and the directional angles "lead" and "elevation" the guided missile must have during launch. These directional angles are supplied from directional angle computer 42 to control unit 46, which, directly before launch, locks the lead on platform 10 and the elevation on launch apparatuses 12, 13 and sensor housing 21 connected therewith; that is, it pivots platform 10 by an azimuth angle $\alpha$ that corresponds to the lead via adjustment drive 23, and launch apparatuses 12, 13 with sensor housing 21 via adjusting drive 22 by an elevation angle that corresponds to the elevation (FIG. 3). At the moment of lock-on of lead and elevation on platform 10 and launch apparatuses 12, 13, respectively, control unit 46 controls mirror drive 33 of pivoting mirror 29 with the directional angle data such that pivoting mirror 29 is adjusted by an azimuth angle and elevation angle $\alpha$, $\epsilon$, which respectively correspond to the lead and elevation, counter to the direction of adjustment of platform 10 and launch apparatuses 12, 13. The consequence of this is that, as indicated in FIG. 3, longitudinal axes 39, 40 of launch directions 12, 13 are oriented away from the airborne target and toward the so-called "kill point," while lines of sight 31, 32 of target-tracking sensor 25 remain oriented toward the airborne target because of the adjustment in the opposite direction of pivoting mirror 29; hence, despite the pivoting of sensor housing 21 with launch apparatuses 12, 13 in the direction of the "kill point," the contact of target-tracking sensor 25 with the target is maintained.

Figure 2:
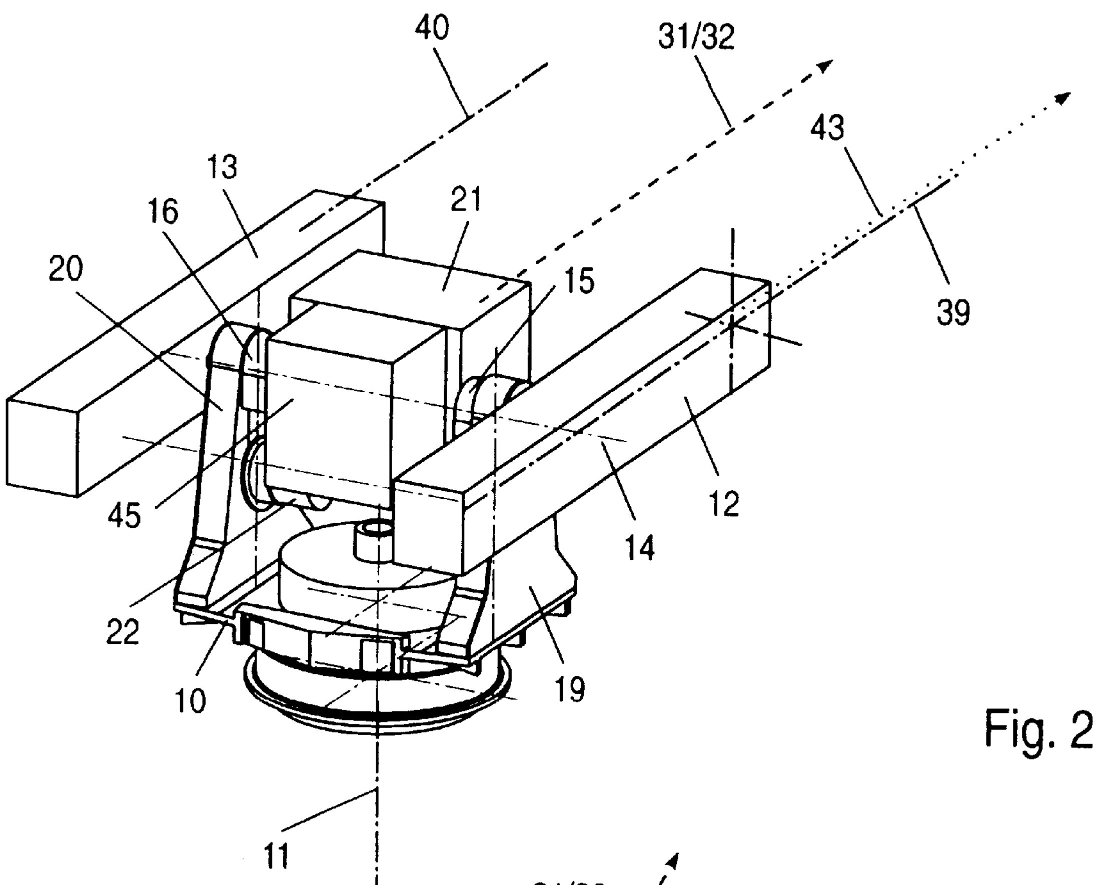
FIGS. 2 and 3 are representations in perspective of the structural design of the fire-control apparatus in FIG. 1 during tracking (FIG. 2) and after target lock-on (FIG. 3).

For the sake of completeness, the line of sight of the homing head of a guided missile, which operates on an infrared basis is also shown in FIGS. 2 and 3, with the missile ready to be launched from launch apparatus 12. This line of sight is marked with 43. During tracking (FIG. 2), the line of sight of the IR homing head is securely coupled to longitudinal axis 39 of launching device 12. Line of sight 43 of the IR homing head and the longitudinal axis of launch apparatus 12 are flush. Upon lock-on of lead and elevation on launch apparatus 12, the target data are locked onto the IR homing head of the guided missile, and its line of sight 43 is simultaneously decoupled from the longitudinal axis of launch apparatus 12. Line of sight 43 of the IR homing head thus orients toward the target. This is illustrated in FIG. 3 by a dotted line representing sight 43 of the IR homing head. In contrast to this line of sight of the IR homing head, which is oriented toward the target, longitudinal axis 39 of the launch apparatus is pivoted in azimuth by angle $\alpha$, and in elevation by angle $\epsilon$, as shown in FIG. 3; longitudinal axis 39 of launch apparatus 12 is oriented toward the previously calculated "kill point." The same description also applies to launch apparatus 13 and the guided missile inside it that is ready to be launched.

Because the second launch apparatus 13 is always oriented exactly as the first launch apparatus 12, and target-tracking sensor 25 does not lose target contact when locking on to lead and elevation on launch apparatuses 12, 13 because of the pivoting adjustment in the opposite direction of pivoting mirror 29, a second guided missile can be launched relatively quickly toward the airborne target from launch apparatus 13 after launch apparatus 12 has fired and a new target has been acquired with the calculation of lead and elevation by directional angle computer 42, and the new lead and elevation have been adjusted on launch apparatus 13. In the same way, a second target can that is flying relatively closely to the tracked airborne target, and is therefore constantly present in the visual field of target-tracking sensor 25, can be attached. After launch apparatus 12 has fired at the tracked target, lines of sight 31, 32 of target-tracking sensor 25 can be adjusted quickly to the second target, and this target can be assessed and attacked in the same manner. The time span required for the new target attack by the second launch apparatus 13 after the first launch apparatus 12 has fired is very short, which significantly increases the fighting power of the anti-aircraft defense system.

To assure problem-free functioning of target-tracking sensor 25, stabilization of the lines of sight 31, 32 is imperative. This stabilization is relatively simple to achieve when pivoting mirror 29 is switched into the lines of sight 31, 32, for which purpose stabilization electronics 44 generates corresponding control signals that are converted by control unit 46 for corresponding actuation of adjustment drive 33 for pivoting mirror 29. Follow-up computer 41, directional angle computer 42, control unit 46 and stabilizing electronics 44 are combined in an electronic box 45, which is preferably flanged to sensor housing 21, as shown in FIGS. 2 and 3. The transmission of the control signals from control unit 46 to adjustment drive 23 for platform 10 is effected via slip rings 47.

What is claimed is:

1. A fire-control apparatus for anti-aircraft defense systems comprising: a platform that rotates around a vertical axis; at least one launch apparatus for guided missiles equipped with homing heads, which apparatus is pivotable around a horizontal axis and is disposed on the platform; at least one optical target-tracking sensor which continuously determines target position, velocity and range data, rigidly coupled with the launch apparatuses; a directional angle computer that is connected to the target-tracking sensor and, from the target data, calculates the estimated point of impact of a guided missile and an airborne target and the directional angles "lead" and "elevation" necessary for the launch of the guided missile; a follow-up computer that is connected to the target-tracking sensor and generates follow-up signals in azimuth and elevation from the deviations of the target position from the line of sight of the target-tracking sensor; a control unit, connected to the follow-up and directional angle computers and having adjustment drives for the platform and launch apparatus, which pivots the platform in azimuth and the launch apparatuses in elevation as a function of the follow-up signals, and which, directly prior to launch and in response to a launch signal, locks the lead on the platform and the elevation on the launch apparatus; a vertically and horizontally pivotable pivoting mirror for guiding the line of sight of the target-tracking sensor; and a mirror drive that drives the pivoting mirror and is controlled by the control unit such that the pivoting mirror is adjusted, prior to launch and during the time the lead on the platform and the elevation on the launch apparatus are locked on, in lead and elevation by an azimuth angle ($\alpha$) and an elevation angle ($\epsilon$) corresponding to but counter to the direction of adjustment of the platform and the launch apparatus.

2. An apparatus as defined in claim 1, wherein the pivoting mirror is electronically stabilized biaxially.

3. An apparatus as defined in claim 2, wherein: the target-tracking sensor and the pivoting mirror are disposed, with the mirror drive, inside a sensor housing that has a viewfinder window; and the sensor housing is rigidly secured to a pivot shaft of the launch apparatus, which shaft is received in pivot bearings secured to the platform.

4. An apparatus as defined in claim 1, wherein: the target-tracking sensor and the pivoting mirror are disposed, with the mirror drive, inside a sensor housing that has a viewfinder window; and the sensor housing is rigidly secured to a pivot shaft of the launch apparatus, which shaft is received in pivot bearings secured to the platform.

* * * * *